Patented Nov. 21, 1939

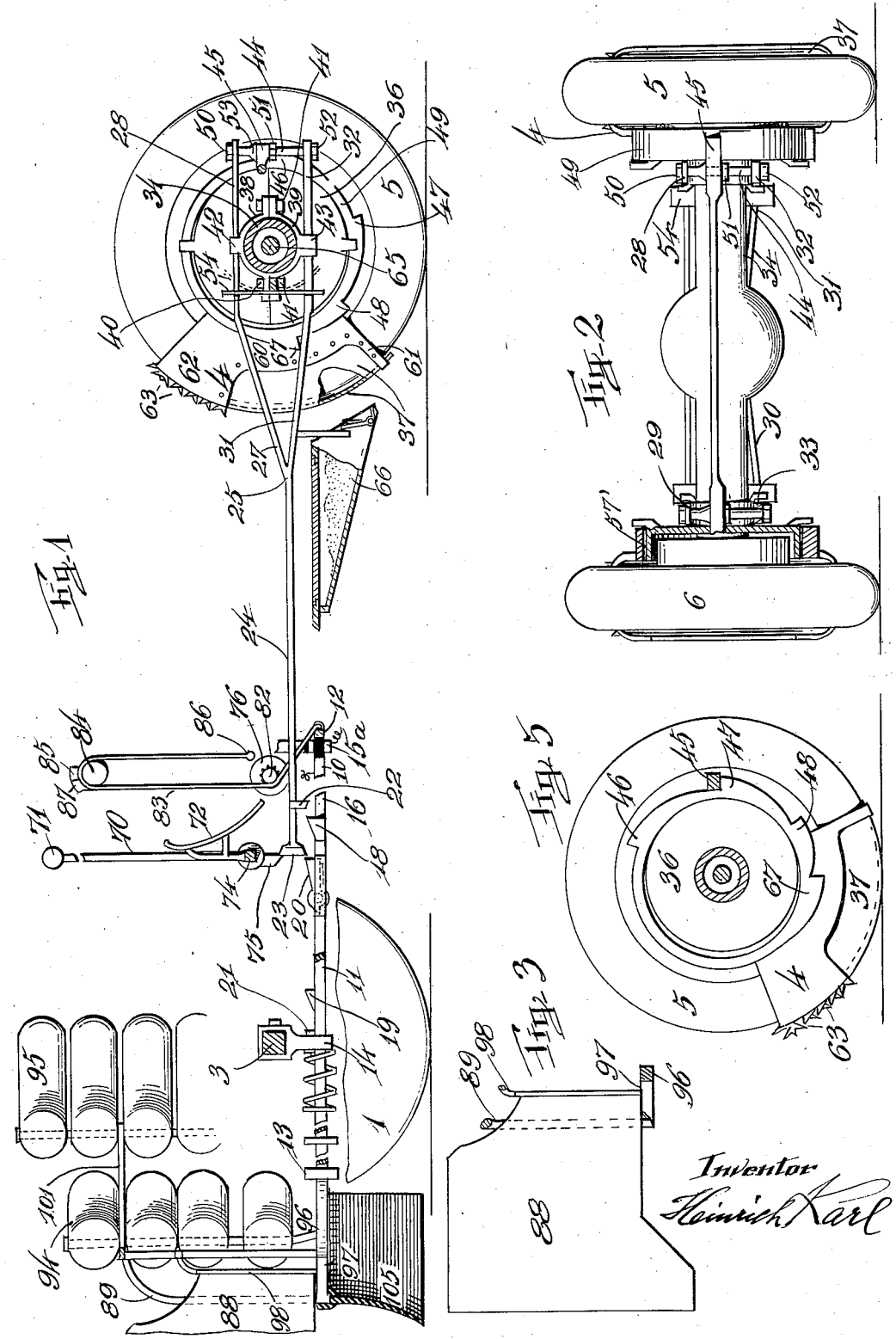

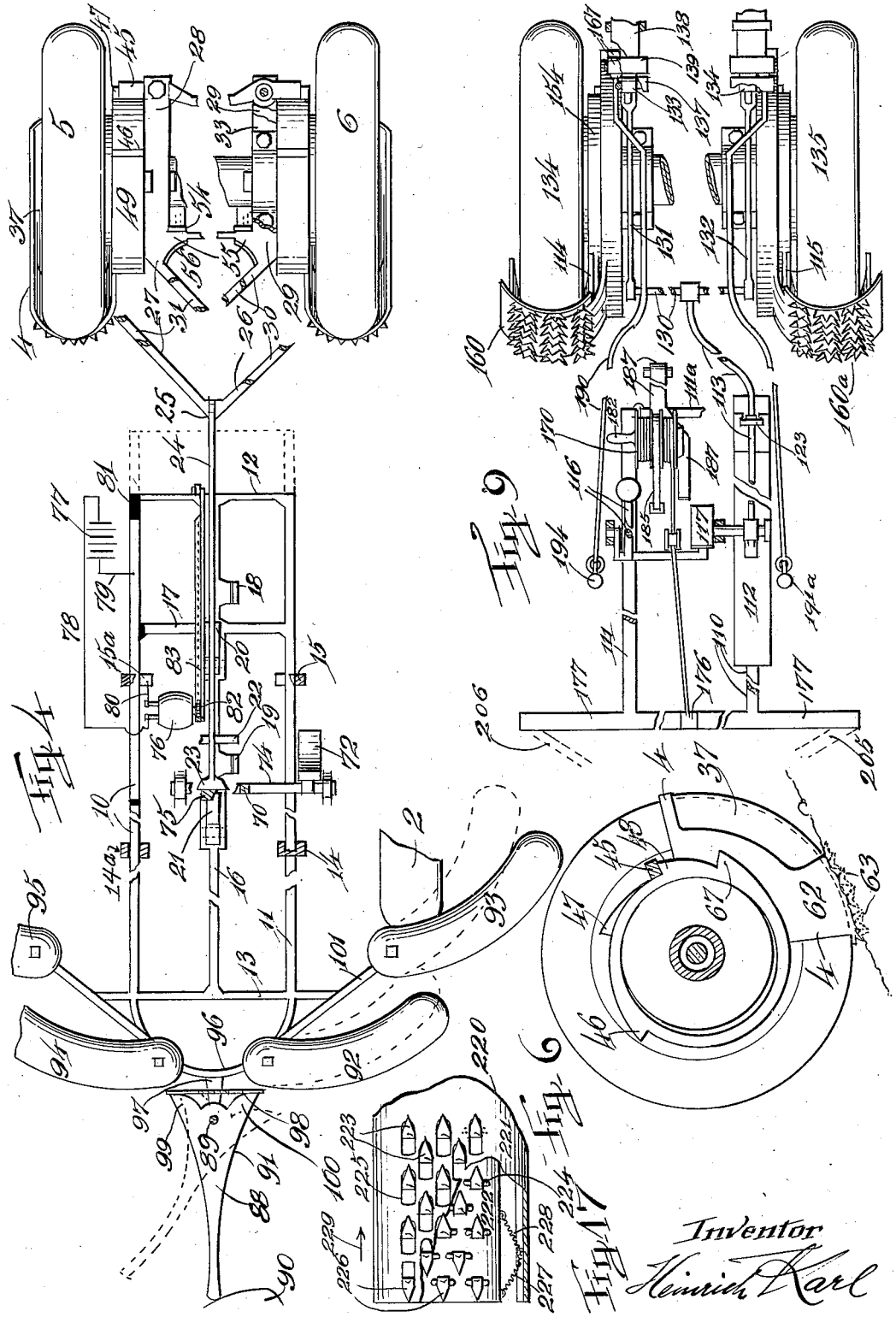

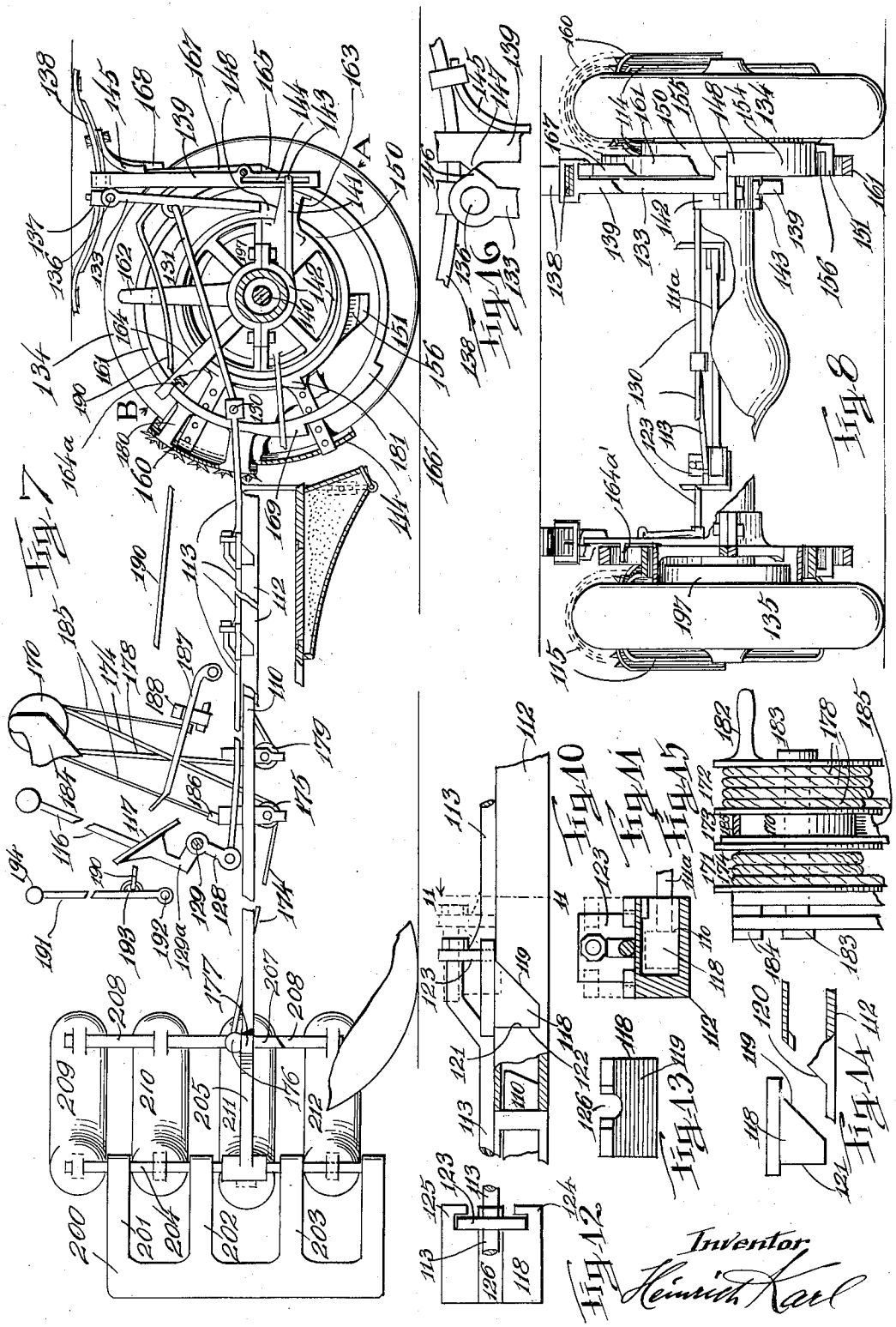

2,180,846

UNITED STATES PATENT OFFICE 2,180,846

AUTOMATIC AND MANUALLY OPERABLE STOPPING AND ASSISTING DEVICE FOR AUTOMOBILES

Heinrich Karl, Jersey City, N. J.

Application February 15, 1937, Serial No. 125,793

15 Claims. (Cl. 180—83)

This invention has relation to my U. S. patent application Serial No. 640,183 filed Oct. 29, 1932, that issued as the United States Patent No. 2,097,329 on Oct. 26, 1937, and to my United States patent application Serial No. 15,367 filed April 9, 1935 that issued as the United States Patent No. 2,116,604 on May 10, 1938, and for which latter application division was required. The improvements in the present invention relate to many parts.

These manually and automatically operable devices are created in view of the demand for greater safety both for the occupants of the automobile and for the pedestrian. Another of the purposes of the invention is the creation of a brake shoe or shoes that might supersede or be substituted for another brake system, as, for instance, the commonly used band-brake. The arrangement of parts is such that aside from the advantages over known types of band brakes the appearance of which cannot be equalled by the band brake, the elegance of the automobile will not be marred but to the contrary will be enhanced because of the simplicity of the invention.

The automatic part of the invention consists mainly in the co-operation of a fender having a recoil action that permits a pedestrian that should happen to be in the path of the automobile, equipped with the improved brake, to move said fender backwards either with the hands or through the impact, which latter, however, will be only light compared with the impact of the automobile body. As the fender recoils when the moving car collides with a pedestrian, or with any stationary object, a pair of brake shoes similar to those described in the aforementioned patent application Serial No. 640,183, moves to braking position in which the shoes will be interposed between the rear wheels and the ground and thus bring the vehicle to a stop. The wheels, however, are allowed to turn freely and thus prevent the sudden shock which might otherwise occur. It is this circumstance that prevents also the overturning or somersaulting of the automobile at a sudden stop. The stopping of the forward movement of the automobile takes place before the fender has completely recoiled. By the provision of such a fender, the possibilities of avoiding serious injury to persons (pedestrians as well as drivers and passengers) is enhanced and damage to the vehicle is reduced.

A further object of the invention is the creation of a novel arrangement on the brake shoe that permits the same to be used in aiding the vehicle to overcome obstacles, such as steeply inclined roads, and ice or snow covered surfaces on which the rubber tires or other wheels would not grip sufficiently. Furthermore, the brake shoe that may consist of one or of two separately operable units may be employed to prevent the vehicle from sliding backwards or forward when moving up or down a steep incline.

Another object of the invention is to permit in a novel manner the manual operation of the devices for bringing the brake shoes into operative or inoperative positions. Still another object is to provide a recoil fender having a front part of rubber or other soft material that is adapted to move the movable object, such as a pedestrian to one of the two sides of the center path of the automobile and, in association with other parts, to shove the pedestrian completely out of the path of that automobile and to soften the impact of the collision to a degree that will not harm the pedestrian.

Another object of the invention is the creation of a braking system which is not dependent upon the degree of effort exerted by the driver of a vehicle to stop the same.

Another object is to utilize two brake shoes in superimposed relation on one vehicle wheel whereby one of the brake shoes may be provided with metallic points that are adapted to penetrate the ground.

Another object of the invention is to create a braking system with the use of a braking and assisting shoe in which the pressure exerted by that shoe finds its counterpressure sustained by the wheel axle or the housing thereof.

Another object of the invention resides in the creation of a braking shoe whose revolvable hub portion and the shoe itself are held in an eccentric position relative to the wheel axle by the pressure of a spring, whereas according to my patent application Serial No. 640,183 that issued as the United States Patent No. 2,097,329 on October 26, 1937, it is a projection that causes that effect.

Another object of the invention is to create means by which the fender may be automatically or manually advanced.

Another object of the invention is to create means for advancing the recoil fender and for pulling it backwards to adjust it to various positions appropriate in certain situations and in which means are provided for permitting the driver to exert a braking action upon the recoil fender.

Another object of the invention is to create means for holding the brake shoes in other positions than the totally operative braking position or the inoperative position, as, for instance, in the position in which the brake shoe is to assist the wheel.

Still another object of the invention consists of the creation of various modifications for automatically and manually operating the recoil fender and braking shoes.

Many other novel details and features will appear in the following detailed description.

The invention is illustrated in the accompanying drawings which form part of the specification and of which:

Figure 1 is an elevation, partly in section, of one form of apparatus embodying the features of the present invention, the parts being shown in their normal positions.

Figure 2 is a rear elevation, partly in section, of the rear end construction shown in Figure 1.

Figure 3 is a side elevation, partly in section, of a deflector member constituting a part of the recoil member.

Figure 4 is a top plan view of Figure 1, the dotted lines indicating operated positions of certain of the parts, and the brake shoes being shown partially operated.

Figure 5 is a side elevation showing the position a brake shoe assumes in Figure 4 wherein one portion or section of the shoe is contacting the ground.

Figure 6 is a side elevation showing the position of the brake shoe when its other portion engages the ground, as may be accomplished when a vehicle is on a steep incline.

Figure 7 is a side elevation of a modified form of the invention in which the rear wheels of the vehicle are each provided with two brake shoes.

Figure 8 is a rear elevation, partly in section, of the construction shown in Figure 7.

Figure 9 is a top plan view, partly broken away, of the construction shown in Figure 7 and showing the mechanism for operating the four brake shoes of the two rear wheels of the vehicle.

Figure 10 is a fragmentary elevation, partly in section, of the fender frame.

Figure 11 is a section on the line 11—11 of Figure 10.

Figure 12 is a top plan view of a detail shown in Figure 10.

Figure 13 is a rear elevation of a detail shown in Figures 10, 11 and 12.

Figure 14 is another elevation of the element shown in Figure 13 and illustrating the same separated from another part which it normally engages.

Figure 15 is an elevation of a windlass employed in connection with the modification of Figure 7.

Figure 16 is an enlarged elevation of a detail shown in Figure 7, and,

Figure 17 is a plan view, partly broken away and shown in section, of a modified form of brake shoe such as may be employed with the construction shown in Figure 1.

Referring to Figures 1, 2, 3 and 4, 1 is the right front wheel, 2 the left front wheel, 3 the stable axle thereof, 4 the right side brake shoe. 10, 11, 12 and 13 represent the outer parts of the frame of the recoil fender in its simplest form that is adapted to slide in guides 14, 14a and 15, 15a that are so formed on their lower portions to permit other parts of the fender to pass unhindered. Midway between the rods 10 and 11 there is another part 16 extending from and held by the front bar 13 and reaching to the cross bar 12 to which it is also secured. An additional cross bar 17 may be added. On the central rod 16 there are various bolt shaped extensions, of which those indicated by 18 and 19 are rigid, while those indicated by 20 and 21 are preferably pivoted and yieldably arranged bolts so adjusted that pressure only from above will press them down.

The extension 18, and the pivoted bolt 20 are so spaced on the central rod 16 that the former faces a downwardly extended part 22 with inclined under surface, while the bolt 20 will be in front of a buffer-like part 23 when the fender frame is pulled completely to its foremost position. The buffer-like part 23 belongs to the rod 24 with which it is rigidly united. Part 22 is not rigidly united with rod 24; it is suitably held in the position in which it engages the underside of rod 24 and thereby holds the front end of that rod in correct position relative to the bolt 20 and to a tooth, to be described later. Part 22 yields to pressure exerted by the extension 18 and thus lifts the rod 24 and buffer-like part 23. The latter comes thereby out of engagement with the bolt 20 and permits the fender and its frame to recoil still further, but the rod 24 and its buffer-like part 23 will be moved forward again by a spring to be described later. This occurs when the pivoted bolt 20 has pushed the buffer-like part 23 sufficiently in a rearward direction as to cause thereby by means of the rod 24 and associated other parts, to be described subsequently, the disengagement of a crossbar from the shoulders of parts that are associated with the brake shoes, as will be explained hereinafter in detail. The extension 18 is therefore normally distanced farther from the part 22 than is the bolt 20 from the buffer-like part 23 and the difference in distance equals therefore at least the width of said shoulders. At the point 25 there are two diverging rods 26, 27 secured to rod 24. Rigidly united with rod 27 is a metal band 28 and another similar metal band 29 is rigidly united with the rod 26. At the point 25 there are also two more rods 30 and 31 rigidly secured to rod 24 and each is rigidly secured to a relatively strong steel band 32, 33, respectively.

Around the axle housing 34 and as close as possible to the rear right side wheel 5 are secured two halves of a part 36 that has a circular circumference. This part represents the stable hub portion that serves as a guide for the brake shoe 4 which has a movable hub portion and which will be described subsequently.

The two halves of part 36 immediately surrounding the axle housing 34 are indicated by 38, 39 and both have extensions. These extensions, which are in front and in the rear of the part 36 permit the securing of one half of the part 36 to the other by means of bolts and nuts 40, 41 whereby the whole part 36 will be secured to the axle housing 34. Obviously, the stable hub portion 36 may be secured to the axle itself, should the latter be of the rigid type, whereby no axle-housing is employed. The part of the hub portion 36 that is nearest to the wheel 5 is drum-shaped; it has a relatively large diameter for various reasons and is open on the side that faces the wheel 5. One of the reasons of forming the hub portion 36 of a relatively large diameter is that of permitting the usual band-brake to remain on the vehicle if the present invention is to be installed as additional equipment.

Another of the reasons for giving the hub portion of the brake shoe a large diameter is to permit the brake shoe to get a greater resistance towards its opposing parts which latter are positioned near to the wheel circumference as will be pointed out later.

On top of the portion 38 which forms part of the stable hub-portion 36, is a guard 42 that prevents the band 28, that rests and moves on that portion 38, from slipping to the axle housing. Likewise the guard 43 is also arranged on the part 39 to prevent the steel band 32 that engages that part with its upper side to slide sidewise out of engagement therewith.

At their rear ends, the metal band 28 and the steel band 32 have a common bolt 44 that is also passed through the already mentioned crossbar 45 that has angularly shaped ends for the purpose of engaging the shoulders 46, 47, 48 and 67 of the movable (revolvable) hub-portion 49 of the shoe 4. Nuts 50, 51 and 52 secure that bolt to the bands 28, 32 and also to the crossbar 45. Above the latter, the bolt 44 is strengthened through an abutment 53 that prevents the crossbar from moving upward. In front of the parts 38, 39 the front side extensions thereof, respectively, there is a leaf spring 54, vertically secured, whose upper part engages an abutment 55 of the band 28 while the lower part engages an abutment 56 of the steel band 32. The leaf spring 54 exerts therefore a forward pressure on the bands 28 and 32 which, however, can be easily enough counteracted by the pressure exerted through the impact at a collision with a pedestrian, which pressure would then be transmitted to rods 24, 27, 31 and the bands 28 and 32. The leaf spring would then assume the position indicated by the dotted lines as seen in Figure 1. The revolvable hub-portion 49, to which is rigidly secured the brake shoe 4, is of annular shape and the inner side thereof, which is that which faces the circumferential cylindrical wall 57 of the stable hub portion 36, is somewhat larger in diameter than the latter. The cylindrical wall 57 is not shown but its counterpart 57' is seen in section in Figure 2. From the previous description it is shown that through the forward pressure of the leaf spring 54 the crossbar 45 will also be pressed against the outer circumferential wall of the revolvable hub portion 49, which latter will thus be pressed forward so that part of its inner cylindrically shaped wall then lies close to the rearmost part of the cylindrically shaped wall 57, mentioned before. The brake-shoe 4 consists of a section 60 that is made of steel and which is firmly secured to the revolvable hub portion 49 so that it has to move in unison with the latter. Another section of the brake shoe is formed as a cut-out that is filled out by a piece of leather, a tough fabric or a piece of sheet metal 37 which, when worn out, can easily be replaced by another new piece that must be fastened to the section 60 by means of small bolts and nuts, or with other well known fastening means and in such way that the inner side remains smooth so that no obstacle is encountered by the wheel 5 when revolving, or when the brake shoe is in braking position.

The part or brace 61 and the part 62, which latter is provided with the spikes 63, should be somewhat flexible so that these parts will resiliently press against the tire of the wheel 5 when the shoe 4 is carried by that wheel from the braking position (see Figures 5 and 6) to the inoperative position shown in Figure 1.

While it has been shown in my United States Patent No. 2,097,329 that the eccentric position of the brake shoe, its hub portion, respectively, is caused by an eccentrically arranged extension on the axle housing, that extension is omitted in the scheme of Figure 1 of the present invention. In lieu thereof it is the pressure of the leaf spring 54 that causes the crossbar 45 to press against the revolvable hub-portion 49, bringing the latter into an eccentric position relative to the axis 65, in which position the brake shoe 4 will be distanced from the tire when it is in normal position. When moving from its operative position, the brake shoe 4 will be pressed against the tire sufficiently to be carried to the top of the wheel by the turning of the wheel when the vehicle resumes its forward movement.

Arrived on top of the wheel, the brake shoe 4 will be spaced from the tire, but the momentum which the brake shoe has acquired while moving up, carries it further and finally it will fall through its weight to the normal position in which it will be ready again for the next application (see Figure 1). The falling of the brake shoe to the normal position is slowed down by the pressure of the part of the crossbar 45 that bears against the revolvable hub-portion 49, whereby the hitting of the shoulder 46 against bar 45 is prevented.

In many instances it will not suffice that only the leather or sheet metal 37 engages the ground, despite the simultaneous sanding of the latter by means of the automatic device 66 which is also shown in my United States Patent No. 2,097,329. In such instances it is necessary to use the part of the brake shoe 4 that is provided with the spikes 63, especially when it deals with ice covered roads or when the forward or backward sliding of the vehicle is to be prevented on inclined roads.

For this purpose, another shoulder 48 is provided for engagement with the end part of the crossbar 45. Should, therefore, the end part of the crossbar 45 engage the shoulder 46, the rod 24 must be pushed back twice for bringing the shoulder 48 into engagement with the crossbar 45. This situation is illustrated in Figure 6. If the brake shoe stays in the position shown in Figure 6, the vehicle will stay stopped. If, however, it is only desired to prevent the forward or backward sliding of the automobile or truck, then it will be necessary to again push the crossbar 45 backwards and forward until the shoulder 48 will be engaged again by said crossbar whereby, in the meantime, the wheels may bring the vehicle forward. This can be repeated as often as necessary until the obstacle is overcome. This applies also to the case in which the vehicle is to go uphill on a steep incline in which case the wheels will then be assisted and the sliding back of the vehicle prevented. It is even suggested to create another shoulder (67) (see Figure 6) which, when brought into engagement with the bar 45, will allow the wheel to grip the ground and will bring the spikes 63 in position to dig into the ground when the wheel should turn in the reverse direction, as, when sliding backwards and while the wheel is again finding support by the shoe 4, it can turn and move forward again. This shows that the brake shoe does not merely serve for stopping the vehicle but also for assisting it in its forward movement under certain circumstances.

In Figures 1 and 4 there are shown the bolt shaped extension 19 and the bolt 21. They are distanced from the same kind of devices indicated by 18 and 20, respectively. Should the bolt 21 reach and therefore push the buffer-like part 23 sufficiently, and should the extension 19 lift that buffer-like part 23 by engaging the part 22, the part of the brake shoe including the spikes 63 will then touch the ground. This may happen on a downwardly inclined and ice covered road where, despite the leather etc. 37 being between the wheel and the ground, the vehicle still slides forward. The spikes penetrate the ground and thus stop the vehicle securely, even before the fender is completely pushed back. The buffer-like part 23 not being in the path of the extensions 18, 19, will not be pushed by the latter since they co-operate only with the part (tooth) 22 that is extended sidewise from the rod 24. In order to permit the manual operation of the shoe 4, so that it can be adjusted into its various positions, there is a pivoted lever 70, with knob 71 on its top, arranged near the driver's seat, whereby a pedal 72 is also brought into connection with the lever 70 for permitting the operation thereof with the foot instead of with the hand. An extension rod 74 (see Figure 4) connected with the lever 70 is journalled so that it can be rocked by hand through the means of said lever or by foot through the medium of the pedal 72. A downwardly extending tooth 75 with inclined under surface is so united with the extension rod 74 that it engages the buffer-like part 23 and pushes the same backwards together with rod 24 and the other parts connected thereto, when the lever 70 is pushed forward, either by hand or by foot. The length of the tooth 75 and its shape, as well as the size and shape of the buffer-like part 23, cause the latter to move past the lowermost point of that tooth when the latter has been moved backwards sufficiently to also push the buffer-like part 23 backwards to effect the disengagement of the crossbar 45 from the shoulder that it engages.

Since the leaf spring 54 returns the rod 24 and buffer-like part 23 immediately the tooth 75 disengages from buffer-like part 23, the driver has then to pull back the lever 70 until the tooth 75 snaps past the buffer-like part 23 which is made possible through the inherent flexibility of the rod 24. The driver thus has to repeat the pushing and pulling of the lever 70 until the certain shoulder is engaged by the crossbar 45 that permits the bringing of the shoe 4 into the position required in that particular situation. If, therefore, the crossbar 45 was engaged by the shoulder 46 and the driver wanted that crossbar to engage the shoulder 47, he simply pushes the lever 70 once forward and then backwards to its normal position. The shoe 4 thus reaching its operative position, then engages its section 37 with the ground. If the driver wants, however, the crossbar 45 that still engages the shoulder 46 to engage the shoulder 48, in which position the shoe brings its spikes into contact with the ground, the driver has to push the lever 70 twice forward and to pull it twice backwards.

For engaging the crossbar 45 with the shoulder 67 when that crossbar engages shoulder 46, the driver has to push and pull the lever 70 alternately three times forward and backwards. If however, the crossbar 45 already engages the shoulder 47, and the driver wants it to engage the shoulder 48 so that the spikes 63 will penetrate the ground, the driver simply has to push lever 70 forward only once and to pull it backwards again. There might be a mirror employed near the driver's place, as is customary, that would show to the driver how the brake-shoe is positioned, should he have forgotten the number of times he pushed and pulled the lever 70.

Having described the mechanisms in connection with the right side rear wheel as far as the present invention is concerned it is deemed unnecessary to describe the similar mechanism in connection with the left side rear wheel 6, which mechanism is the exact counterpart of that shown and described in connection with the right side rear wheel 5. In Figure 2 the mechanism on the rear left side wheel is shown in section.

Once the frame with its parts 10, 11, 12, 13, etc. is pushed back, it will be necessary to pull it forward again to its foremost position. Although manually operable means may be employed for this purpose, as shown in Figure 1 and also in Figures 7 and 15 to be later described, the forward movement of said frame can also be accomplished automatically by the use of an electric motor 76 installed underneath the driver's seat. The electric circuit for operating that electric motor includes the bar 10, the lower one of the two horizontal supports on the hanger 15a on which rests the bar 10, and further includes the battery 77 and the wires 78, 79 and 80.

The wire 78 is in electrical connection with the winding of the electric motor 76 and with the positive side of the battery 77. The wire 79 that is connected to the negative side of the battery 77, is also electrically connected with the bar 10; and the wire 80 that is in electrical connection with the other end of the winding of the electric motor 76, is also electrically connected to the lower horizontal support on the hanger 15a.

At the rearmost end-part of bar 10 there is an insulation 81 which comes into engagement with the electricity conducting part of the support on hanger 15a when the movable frame of the fender is in its foremost position.

Under this circumstance the electric circuit is interrupted and the motor 76 is deenergized. When the electricity conducting part of bar 10 exclusive of the insulation 81, contacts with the conducting part of the support on hanger 15a, the motor 76 is then energized and its armature turns in the direction in which parts associated therewith will pull the frame of the fender forward. These last named associated parts might be of varying character. In order to also permit the manual operation, there is employed, as shown chiefly in Figure 1, a toothed wheel 82 that is mounted on the shaft of the armature of the electric motor 76 with a strap 83 engaging the same. Said strap 83 is secured by its one end to the rear bar 12, preferable near its middle part, and it is also passed over a rounded bar or pulley 84 that may have a stop 85. The other end of said strap may hold a small weight 86 that serves chiefly for maintaining the strap 83 taut.

At some predetermined point, there is an obstruction 87 secured to the strap which is so arranged that it will touch the stop 85 when the frame of the fender is pushed to its foremost position. It is therefore, a means that indicates to the driver how far he has to pull the strap should, for some reason, the electric motor 76 not function. The portion of the strap 83 which engages with the wheel 82 may be perforated to receive the teeth of the latter. With the form of fender frame thus far described, the same may be sufficient to accomplish the desired purpose when collisions with inanimate objects occur; but, in most instances, said frame alone will not suffice for preventing injury to pedestrians, especially when the automobile travels at a high speed. Additional means are, therefore, associated with that frame, so far described, and these consist, first, of a deflector 88 (see also Figure 3) made of bendable rubber or of some other suitable material and which is tapered forwardly as shown in Figure 4. Said member 88 is so positioned on a vertical rod 89 that it may be bent to the right or to the left, according to the direction of the greater impact which the same receives. If, for instance, a movable object 90, shown in Figure 4, collides with said deflector which will normally be in the center line of the path of travel of the vehicle, the same will bend to the right or left, depending upon the position of the object relative to the deflector when the former is struck. Should the object 90 happen to be a pedestrian, he will be pushed to one side or the other by a surface 91 of the deflector and by the yieldable contact elements 92, 93 or 94, 95 of the recoil fender. The elements 92, 93 and 94, 95 are similar to those disclosed in my previously mentioned copending application, Serial No. 15,367 that issued as the United States Patent No. 2,116,604 and operate to deflect the pedestrian out of the path of the vehicle; and at the same time the fender with its frame recoils from the impact. The various elements just described, are mounted on an auxiliary frame which includes a curved rod 96 provided with an extension 97 from which the vertical rod 89 projects.

On the extension 97 there is secured a vertical plate 98 which serves the purpose of maintaining the deflector 88 in its normal condition. The rear of said deflector is formed with right and left tongues 99 and 100 both of which engage, with some pressure, the front of the plate 98. These tongues, being made of rubber or other suitable material, will be compressed by the movement of the deflector to right or left, and will thus act to restore the deflector to normal after pressure thereagainst is relieved. The contact elements 92, 93 and 94, 95 are secured only at their innermost ends to the uppermost curved bar 101 the ends of which extend substantially in the directions of said elements. The latter may be pneumatic in character or may consist of an outer covering filled with any kind of soft material, such as cotton or the like.

Below, and slightly to the rear of the deflector 88 is an auxiliary deflector 105 disposed relatively close to the ground forward of the front wheels so as to deflect smaller or prone objects in the path of the vehicle. Said deflector is sufficiently rigid to cause the recoil of the fender when striking an object, but also has enough flexibility to reduce the possibility of injury to an object struck by it.

The modification shown in Figures 7 to 16, inclusive, is distinguished from the previously described disclosure in that there are, first, two separately and independently operable brake shoes for each of the rear wheels and, secondly, in that the mechanism that is employed for automatically and manually operating the brake shoes differs from that of the previously described mechanism. Referring to Figure 7, the recoil fender is similar to that shown in Figure 1 with the exception of the frame. The latter is distinguished from that shown in Figures 1 and 4 by the mechanism illustrated in connection with the left side of the frame and by the omission of the central rod thereof.

As shown in Figures 8, 9, and 10 the left side rod 110 of the recoil fender frame is movable in a stationary guide 112 open at its inner side and subdivided into several sections of which one is shown in Figure 10. With each of the mechanisms of these sections, it is possible to automatically push the rods 113 backwards, whereby the brake shoes 114, 115 will be released so as to move to their operative positions, as will be evident from the subsequent description. The modification of Figures 7 to 16, inclusive, permits the recoil fender and its frame to be only partially advanced and despite that will operate the mechanism that brings the brake shoes 114, 115 into operative position. This has various advantages since the recoil fender does not, therefore, need to be fully advanced where there is crowded traffic or limited space in which the fully advanced fender would be a hindrance rather than an aid. The rod 113, which consists of several connected sections is also manually operable through a pivoted lever 116 that can also be pushed by a pedal 117.

In its details, the hollow guide 112 in which moves the rod 110, has a cut out section in which fits a wedge shaped part 118. The shape of said part is shown by the Figures 12, 13 and 14. The inclined surface 119 must correspond with the inclined surface 120 of the guide 112, and the vertical front side 121 of the part 118 must correspond with the vertically cut edge 122 of the guide so that the part 118 will fit snugly therein. On its top, the part 118 is linked to a plate or the like 123, so loosely, however, that the part 118 can move upward without being hindered by that plate 123 whose vertical borders are partly surrounded by the hook shaped rear corners 124, 125 respectively, of the top part of part 118. To the plate 123 is secured, by means of a nut, the rear end part of the rod 113 that is in advance thereof, and also secured to said plate is the forward end part of the rod 113 that is in the rear thereof. Plate 123, however, may be integral with the latter rod. There may be a cut out 126 on top of part 118 so that the rear end of rod 113 will not interfere when said part 118 moves upward. This upward movement takes place when the rearward end of the rod 110 (see Figure 10) pushes against the wall 121 of said part 118 which latter pushes then against the front side of the plate 123 and moves the rods 113 backwards. While being pushed backwards the part 118 has to slide upwards on the inclined edges 120 of the guide 112. Rod 110 cannot pass further backwards unless part 118 is fully pushed upward and consequently backward. If this is done the other parts similar to the part 118 are in their uppermost position, and a second operation or disengagement of a shoulder in connection with the brake shoe is therefore excluded while the rod 110 still moves backwards and past some other of said sections. The foremost rod 113 is linked to the arm 128 that is rigidly secured to the journalled shaft 129 whose arms 129a, 129b are rigidly united with the lever 116 and the pedal 117, respectively. By pushing said lever 116 forward the rods 113 are then pushed backwards and the brake shoes 114, 115 are thus brought into operative position through manual operation. The same is the case when the driver steps on the pedal 117. For advancing the recoil fender, there is provided a windlass 170 that is illustrated in Figure 15 and said windlass is chosen for various reasons of which one is that which permits the driver to exert a counter pressure to the recoiling fender if it is deemed necessary. This windlass is constituted by the usual drum like body which, in the present instance, is divided into three partitions 171, 172 and 173, respectively. Of these partitions that are divided by walls, the one indicated by 171 serves for winding up and for unwinding the wire rope 174 that is passed over a pulley 175 and fastened by its one end to a part 176 of the frame that constitutes the foremost cross rod 177 of the frame. The partition 172 to which is secured the wire rope 178 serves for winding up said wire rope and for unwinding it. Wire rope 178 is also passed over a pulley 179 and is fastened to the middle part of the rearmost cross rod 111a that is secured to the rearmost ends of the frame rods 110 and 111 and in such fashion that it will not hamper the frame in its movements.

It will be noted that when the wire rope 178 is being pulled by the rod 111a the same will be unwound at its partition 172 while the wire rope 174 will then be wound up at the partition 171. The driver is therefore enabled to pull the whole recoil fender backwards or forwards to any extent that will suit him in any situation and he can do this by using the handle 182. The drum shaped body 170 is revolvable on a shaft 183 and the latter is secured to stable parts 184 that might belong to a standard at or near the driver's seat. When the driver turns the drum in the direction in which the wire rope 178 will be wound up, the wire rope 174 will then be unwound which then pulls the recoil fender forward. The partition 173 serves the purpose of holding a brake-band 185 in engagement with a section of the drum 170. This brake-band is secured at 186 and is passed over the part of the drum 170 that is limited by the partition 173. The other end of the brake band 185 is secured to the foremost part of a pedal 187 that has a part 188 for locking the pedal in the position in which it pulls the brake-band so that the latter exerts pressure upon the drum 170. Part 188 can be separated from the pedal 187 with a sidewise motion of the driver's foot and, by doing that, the pressure upon the drum 170 will be relieved. The pressure exerted by the brake band may vary according to the pressure of the driver's foot exerted upon the pedal 187 and that braking effect is chiefly intended for counteracting the pressure and advancement of a vehicle that is in a front collision with the recoil fender, while no braking action through the brake band 185 should take place when a collision of the recoil fender takes place with a pedestrian.

The rear part of the last section of the rod 113 is bent inwardly and, if needed, also upwardly and the end is secured to the middle of a crosswise arranged bar 130 to which again are secured the forward ends of the rods 131 and 132. The rear ends of the rods 131, 132 are linked to the vertically arranged latching arms 133, 134 respectively, as shown in Figure 7, and especially in Figure 9. For the sake of shortening the description, only the mechanisms of the invention will be pointed out in detail that are associated with the right side rear wheel 134 since those associated with the left side rear wheel 135 are the counterpart of the former. The latching arm 133 is of the character also shown in my United States Patent No. 2,097,329 mentioned before, but is to be operated in a somewhat different way and has additional parts. It is pivoted to a part 137 that forms the pivot 138, and said part is also secured to a strong spring 138 which is suitably held on the underside of the car body. The strong spring 138 is arranged for absorbing the pressure and the shocks which the latch arm 133 would otherwise transmit directly to said car body. Rearwardly of the latch arm 133 is arranged the bar 139 that has as its main purpose the prevention of the latch arm 133 from moving further backwards than the limit set by said bar 139. In order to hold the arm 139 in correct distance relative to the wheel axle 140 and consequently also relative to the latch arm 133, there is an arm 141 secured to the lower half of the stable hub 142 which is similar to the hub 36 of Figures 1 to 6. This arm 141 has a finger 143 at its rearmost end that is directed to the right and which extends into a slot 144 of the bar 139. This slot allows the bar 139 to move vertically up and down with the car body while the latter moves and while the arm 141 and its finger 143 stay in a more or less rigid position. Arm 139 is not rigidly fastened to the spring 138 but is hung up on the same, that is, spring 138 is passed through a hole on the uppermost part of the bar 139. In addition there is another relatively strong spring 145 so secured to the spring 138 that its free end presses against the bar 139 and thus brings the uppermost front side into pressing engagement with the upper annularly shaped hinge-part of the latch arm 133. At their uppermost meeting points the latch arm 133 and the arm 139 are provided with projections 146, 147, respectively, which each culminate in an edge. These formations are best seen in Figure 16. The latch arm 133, when moved to its forward position in which an extension 155 on its lowermost end engages the shoulder 148, brings the extension 146 into the position in which it is situated right underneath the edge part of the extension 147. The strong pressure exerted by the spring 145 upon the arm 139 also causes pressure upon the upper part of the extension 146 by the extension 147 which thus keeps the extension 155 on the latch arm 133 firmly engaged with the periphery of the revolvable hub portion 150 of the brake shoe 114. It is the pressure exerted by the latch arm extension 155 that keeps the brake shoe 114, and consequently its revolvable hub portion, in an eccentric position relative to the wheel axle and also relative to the stable hub 142. It is also that same pressure that keeps the shoe 114 in engagement with the tire of the wheel 134 when said brake shoe is moved to the inoperative position by said wheel; and it is also the same pressure that keeps the brake shoe 114 distanced from the wheel tire when said brake shoe is in its inoperative position. Further, the same pressure prevents the brake shoe from falling with a heavy impact into the inoperative position after it has arrived on top of the wheel 134 when the latter has carried it there from the operative position thereof. If said latch arm 133 is being pushed back automatically or manually the extension 146 will encounter the obstruction of the extension 147 that is situated on the arm 139, and unless the counter-pressure exerted by the spring 145 is overcome as far as to permit the edge part of the extension 146 to get above the edge part of the extension 147 the arm 133 will not stay backwards. If, however, the edge of the extension 146 snaps past the edge of the extension 147 and thereby arrives above the edge of the extension 147, only then will the lowermost end part of the latch arm 133 be held close and firmly enough to the arm 139. It is in that position in which the shoulder 151 which has been disclosed already in my United States Patent No. 2,097,329, will be engaged by the extension 155 of the latch arm 133 when the brake shoe 114 is in its operative position. For disengaging the extension 155 of the latch arm 133 from the shoulder 151 said latch arm must be pulled forward manually by means of the lever 116 so that its extension 155 will come into engagement with the peripheral surface 154 of the revolvable hub portion 150. The shoulder 151 is partly separated from that peripheral surface 154 by the channel 156 and the extension 155 coming into alignment with the channel 156 when the latch arm 133 is pulled forward permits thereby the revolvable hub portion to move together with the shoe 114 to the position in which the extension 155 engages the shoulder 181. The edge of the extension 146 arrives thereby underneath the edge part of the extension 147 and pressure is thereby exerted by the extension 155 of the latch arm 133 upon that peripheral surface 154 and the brake shoe will be pulled and drawn thereby against the wheel tire in the direction of the axle 140 of the wheel when that brake shoe 114 arrives at the point approximately indicated by A. When the shoulder 181 is engaged by the extension 155 of the latch arm 133, the brake shoe 114 does not engage the ground should the wheel move forward. Although there is a slight pressure exerted upon the tire by said brake shoe, that pressure will not amount to a braking effect. Should the vehicle move uphill and the wheel 134 turn backwards as, while sliding down hill in a backward direction, the shoe 114 will then slide between the wheel and the ground thereby supporting the wheel in its forward motion. The shoulder 181 thus becomes again engaged by the extension 155 of the latch arm 133 and the brake shoe does not engage the ground. For disengaging the shoulder 181 from the extension 155, the driver simply has to push the lever 116 forward and to pull it backward again while the wheel 134 moves forward again. The brake shoe which is drawn against the tire will be moved up by the latter until it arrives on top of the wheel 134 where it will go gradually out of engagement with the tire and completely out of engagement therewith when it arrives at the point indicated by B. Arrived at that point, the brake shoe 114 falls down through its weight to its inoperative position in which the extension 155 of the latch arm 133 engages the shoulder 148. If then the latch arm is pushed backwards the shoulder 148 disengages from the extension 155 and the brake shoe 114 falls to the operative position in which it will be positioned between the still revolving wheel 134 and the ground. The wheel 134 not gripping the ground despite its revolving motion, thus cannot advance the vehicle and a sudden stop takes place which, however, is of no harmful consequence to the vehicle due to the fact that the rear wheels can still turn as fast as possible thereby eliminating the sudden shock that usually causes the vehicle to overturn.

In the modification of Figures 7 to 16 there is no section provided for on the brake shoe 114 that has spikes but instead there is a special brake shoe arranged which is indicated by 160. This brake shoe 160 also has a revolvable hub portion 161 and the latter is sufficiently distanced from the hub portion 150 that the shoulders 148, 151 of the latter will not be hampered in their motion. For keeping the revolvable hub portion 161 in such position and to permit it, at the same time, to be in an eccentric position relative to the wheel axle 140, there are at least three extensions 162, 163, 164 provided for on the stable hub 142 with guides that face the inner circular surface of the hub portion 161 while a guard is arranged on each outer end of the extensions 162, 164 for preventing that hub portion from slipping off the guide part. The guide or guides 164a are simply employed to avoid falling of the brake shoe 160 too far so as to prevent its hub portion 161 from sliding on the ground; but on the other hand they are so arranged that they will not prevent brake shoe 160 from still engaging the tire of the wheel when it arrives on top of the wheel. Also, in connection with the revolvable hub-portion 161 shoulders are employed. The one indicated by 165 serves for keeping the brake shoe 160 in inoperative position as shown in Figure 7, while the shoulder 166 serves for holding the brake shoe in operative position. Both shoulders are engageable by the latch arm 167 partly seen in Figure 7. Since the operation of the latch arm 167 is similar to that of the cross bar 45 of Figure 1 there is no vertical bar needed in the rear thereof, but a spring 168, also secured to spring 138, exerts pressure upon the latch arm 167 and keeps the same in firm pressing contact with the outer surface of the revolvable hub-portion 161. For operating said latch arm 167, a mechanism is employed similar to the device of Figure 1.

There is still another shoulder 169 arranged on the revolvable hub-portion 161 which serves for holding the brake shoe 160 in a position in which it does not engage the ground, whereby it will be touched by the brake shoe should the wheel move backwards, as on an incline on which it slides backwards. The wheel thus finds a hold on the brake shoe and can move forward again. Although the brake shoe exerts a little pressure on the tire of the wheel 134 when in the position in which the shoulder 169 is engaged by the latch arm 167, that pressure, however, is not so strong that it will brake the wheel 134; it simply will suffice to carry the brake shoe 160 to the top of the wheel when the shoulder 169 will be disengaged by the latch arm 167 and the wheel 134 turns in its forward going motion.

The spikes on the shoe 160 may be of any suitable kind and about half the number of the points thereof should be directed partly towards the front and others towards the rear of the brake shoe.

The braces 180 and the parts holding the spikes may be made of flexible steel for allowing some flexibility to the brake shoe when it engages the tire of the wheel 134.

The shoe itself has a curvature in its middle part similar to the wheel 134; it might be somewhat shorter than the shoe 114 and its outer flanking parts are also bent wider than the latter so that it will not interfere when the shoe 114 is operated and, on the other hand, will not be hindered by the shoe 114 when it goes to operative and inoperative positions.

The mechanism for operating the latch arm 167 consists, on the one hand, of the rod 190 that is bent several times so as not to interfere with other parts and, on the other hand, of the lever 191 that is pivoted at 192 (see Figures 7 and 9). Rod 190 is secured to the lever 191 at some convenient part, as at 193, situated between the pivot 192 and the handle part 194 and thus a modification is shown similar to the scheme of the operating mechanism for the cross bar 45 of Figures 1, 2 and 4.

According to the connection with lever 191, the driver simply pushes the lever back for disengaging the latch arm 167 from the shoulder that might be in engagement therewith. A quick release of the lever 191 will prevent the skipping of one or more shoulders should it not be purposely intended to skip two shoulders, as, for instance, in order to have the brake shoe alternately between the ground and the wheel to prevent the latter from skidding. Since the brake shoe 160a, in association with the wheel 135, is the exact counterpart of the brake shoe 169 and since there is a similar mechanism employed for operating that brake shoe by means of the lever 191a, both levers 191 and 191a could be alternately pulled and released by the driver in order to facilitate the forward movement of the vehicle on an ice covered road or on a steep incline. For stopping the vehicle on a steep incline when that vehicle moves down hill, not to mention on ice, snow and sleet covered roads, it will be the brake shoes 160, 160a that will stop said vehicle securely. The wheel is allowed to turn also when the brake shoes 160, 160a are in operative position.

The brake shoes and the mechanisms thereof in connection with the wheel 135 being the exact counterpart of those in connection with the wheel 134, it is not deemed necessary to describe them in detail. In Figure 8 there are, in connection with the left side rear wheel 135, the sections shown of the parts that form part of the operating mechanism for the brake shoes that are associated with said wheel and the drum 197 is also shown that forms part of the band brake.

The foremost part of the recoil fender consists also of a bendable device 200, preferably made of rubber, that reaches nearly to the ground and which has rearwardly extending arms 201, 202, 203 that are secured to a vertical bar 204. Said bar 204 is also secured at the meeting point of the two rods 205, 206 that are obliquely arranged in front of the cross bar 177.

At the ends of said cross bar 177 there are vertical bars 207, 208 to which are secured and obliquely arranged the contact bodies 209, 210, 211, 212, the ones on the left side of the vehicle not being shown in the figures. Contrary to the scheme of Figure 4, however, these bodies are secured at both ends to the bar 204 and to the bars 207, 208, respectively. In Figure 7, only those bodies are shown that are connected to the bars 204 and 208, in order that other structural parts may be shown. Also, in this instance the pedestrian will be deflected out of the automobile's path and will move the recoil part of the fender backwards to bring the automobile or truck to a halt.

Referring to Figure 17, there is a brake shoe 220 shown whose outer part 221 is made of a single piece which, however, might be constituted similarly to the parts 60, 61 and 62 shown in Figures 1, 2, 3, 4, and 5 in which the part 37 is made of a separate piece and even of separate material.

The brake shoe of Figures 1, 2, 3, 4 and 5, having a part with rigidly secured spikes thereon, will leave the marks of the spikes in the ground or on the asphalted street when that brake shoe is moved to operative position and then into the inoperative position. To avoid the imprints of the spikes on the road surface the spikes may be made retractable so that they will remain in a non-projecting position when the brake shoe is not held fast for absolutely stopping the automobile with the aid of the spikes.

For this purpose there is a slidable, suitably bent member 222 of sheet metal arranged interiorly of the brake shoe and so shaped on its side that faces the tire of the wheel that the tire will not be injured thereby. On the side that faces the interior side of the brake shoe there are arranged the spikes 223 which are preferably held by pivots 224 that are secured to said slidable member 222. Corresponding with the position of the spikes 223 there are holes 225 of elongated shape in the wall 221 of the brake shoe which permit the spikes to lie in them when these spikes are turned in so as to lie against the brake shoe. In that position little of the wall 221 that is situated at the one end of the hole 225 remains underneath the point of the spike 223. That end part at each hole may be depressed so that the point of the spike may lie in the depression so that it may be more or less flush with the surrounding part. There are also other spikes 226 arranged at the extreme end of the brake shoe which are so pivoted and otherwise arranged in respect to the holes thereof that their points are directed in the opposite direction to those of the others indicated by 223, but they are otherwise similar to the latter. The slidably arranged member 222 is preferably held to the brake shoe wall by the springs 227, 228 and the latter return this member 222 to its normal position as soon as the pressure upon it ceases that is exerted by the wheel and which presses it firmly against the brake shoe wall 221. The holes 225 are in excess of the length of the spikes and the side which is opposite to that in which the spikes normally lie is therefore free.

The structure permits therefore the member 222 to be moved in either of two directions that will be caused by the tire of the wheel when the latter turns in the forward or in the backward driving motion, respectively. If that motion is forward, the member 222 will be moved a little distance in the direction of the arrow 229. Should that particular part of the brake shoe 220 lie between the ground and the wheel, the spikes 223 will thus be moved against the right side end of the holes 225 and finding there the opposition of the wall 221, will be erected and thereby will enter the ground. Referring to the spikes 226, the scheme is the same with the distinction that the member 222 has to move in the reverse direction of the arrow 229 for erecting these spikes so that they will enter the ground. The spikes 226 will be erected when the wheel turns backward should that particular part of the brake shoe be situated between the wheel and the ground. The broad ends of the spikes will prevent them from being turned to the opposite ends of the holes.

It is obvious that vehicles, other than automobiles or trucks, might be wholly or partly equipped with the afore-described invention. There is also the possibility of arranging the various parts of the invention in such way that other structural parts of the automobile or truck are not in the way of such parts.

The springs that support the automobile body and which are secured to the axle housing 34 could remain in their proper places and parts like the bands 28, 29 and associated elements might be shifted further towards the middle of the axle housing, whereby the cross bar 45 would not need to be shortened. Also the various revolvable hub portions might be made still narrower, if other structural parts of the car or truck demand it. The mud guards of the automobile usually leave enough space between themselves and the respective wheel tires so that the brake shoes will not be obstructed by them.

What is claimed is:

1. In an automatic and manually operable stopping and assisting mechanism for automobiles, brake shoes of the kind that are carried from the operative to their inoperative position through the revolving wheel with which they are associated, a non-revolvable hub secured to a rigid part of the automobile in proximity to said wheel and having parts serving as guides, a revolvable hub portion for each brake shoe mounted on said non-revolvable hub and movable within the limits set by said guides, said shoe securely united with its revolvable hub portion and held together with it in an eccentric position relative to the wheel axle through the pressure of a spring exerted indirectly upon the revolvable hub portion when the brake shoe is in non-operative position and when it is being carried to that position by the revolving wheel, means for automatically actuating the brake shoes at the occurrence of collisions, and manually operable devices for bringing the brake shoes to and out of operative position.

2. In an automatic and manually operable stopping and assisting mechanism for automobiles, brake shoes of the kind that are carried from the operative to their inoperative position through the revolving wheels with which they are associated, a non-revolvable hub in connection with each brake shoe adapted to guide the latter, a revolvable hub portion for each brake shoe directly engaging said non-revolvable hub, said brake shoe together with its revolvable hub portion held in an eccentric position relative to the wheel axle housing through the pressure exerted indirectly by a springy means, surfaces of said brake shoes that come into engagement with the ground being relatively smooth so that the ground will not be dug into thereby, and other surfaces of brake shoes, adapted to come also into engagement with the ground, provided with spikes in order to permit the latter to dig into the ground when coming into engagement with it, for firmly stopping the automobile.

3. In an automatic and manually operable stopping and assisting mechanism for automobiles, brake shoes of the kind that are carried from the operative to their inoperative position through the revolving rear wheels, two separately operable brake shoes for each one of the rear wheels, one of these last mentioned brake shoes having a relatively smooth surface that is engageable with the ground and the other brake shoe having spikes provided on its surface, that are engageable with the ground, to permit them to dig into the ground for firmly stopping the vehicle, as, for instance, on an inclined ground, and means for optionally bringing the spikes into engagement with the ground for assisting the automobile in its forward movement.

4. In an automatic and manually operable stopping and assisting mechanism for automobiles, brake shoes of the kind that are carried from the operative to their inoperative position through the revolving wheels with which they are associated, a section of one brake shoe having a surface that is engageable with the ground and being of a relatively smooth character that will not damage the ground also when the latter is not paved, another section of the same brake shoe, however, having spikes, so arranged, that they are engageable with the ground, and if engaging with the latter dig themselves into it for securely stopping the automobile, and means for optionally bringing the section with the spikes into engagement with the ground to assist the automobile in its forward movement on slippery or inclined surfaces.

5. In an automatic and manually operable stopping and assisting mechanism for automobiles, brake shoes of the kind that are carried from the operative to their inoperative position through the revolving wheels with which they are associated, a recoil fender consisting of a frame and of a front part, mechanism co-operating with said brake shoes, said frame having means adapted to co-operate with said last mentioned mechanism for effecting the same to actuate the brake shoes to move to the operative position when said frame is pushed backwards, as, through the occurrence of a collision, said frame, together with said front part, arranged to recoil also after the automobile has been stopped by said brake shoes, and means for automatically and manually advancing again said frame and front part after having been pushed rearwardly.

6. In an automatic and manually operable stopping and assisting mechanism for automobiles, brake-shoes of the kind that are carried from the operative to their inoperative position through the revolving wheel with which they are associated, a stable hub of circular concentric shape fixed relative to the wheel axle and forming a guide for the single brake shoe and for a part that is united with the latter, a revolvable hub-portion of annular shape with four shoulders securely united with the brake shoe, forming said part that is united with the latter and having a cylindrical wall that faces the circumferential outer part of the stable hub and being larger in diameter than the latter, a cross bar having angular end parts that are adapted to engage any of said shoulders and besides exerting pressure upon said revolvable hub portion for holding the latter in an eccentric position relative to the wheel axle, a spring so arranged that it causes said pressure exerted by said cross bar, a part used for moving said cross bar into and out of engagement with said shoulders, said cross bar united with other members and being so arranged relative to the latter as to exert pressure upon them and also upon other parts engaged by said members and which are associated with the wheel axle, should said shoe be in active position, said last mentioned members arranged crosswise relative to the wheel axle and exerting pressure in the direction of the latter when said crossbar engages one of said shoulders, said other parts which are associated with the wheel axle thus forming the ultimate resisting bearers of the pressure of said shoulders to said crossbar.

7. In an automatic and manually operable stopping and assisting mechanism for automobiles, a brake shoe of the kind that is carried from the operative to its inoperative position through the revolving wheel with which it is associated, a revolvable hub portion to which is secured said brake shoe, said revolvable hub portion having a special shoulder, a manually and automatically operable part for engaging said shoulder, said shoulder so arranged in relation to the position of the brake shoe that when that shoulder is engaged by said manually and automatically operable part said brake shoe will not engage the ground, said brake shoe being drawn to the ground and forming a support for the wheel when the latter moves backwards contrary to the intended direction of travel, as, when the automobile is to move uphill and said wheel slips backwards on the incline.

8. In an automatic and manually operable stopping and assisting mechanism for automobiles consisting partly of brake shoes that are carried from their operative position to their inoperative position through the revolving wheels with which they are associated, an operating mechanism for said brake shoes comprising a rod with a buffer-like part, a part near the driver's seat, adapted to be operated by hand for engaging the buffer-like part and to push the latter backwards, another part for achieving the same function being operable by foot, automatic means for pushing said buffer-like part, including a recoil fender and a frame forming part thereof, bolt shaped parts on said frame adapted to engage said buffer-like part when said fender and frame is being pushed backwards at the occurrence of a collision, extensions on said frame adapted to engage a part associated with said rod for lifting the latter and thus disengaging said buffer-like part from the bolt shaped part, the latter being depressible from above against the pressure of a spring, but not yieldable to the counter pressure of said buffer-like part that is exerted against its rear end, mechanism associated with said rod adapted to bring said brake shoes into operative position through the pushing of said rod and to bring said brake shoes into inoperative position also through the pushing of said rod.

9. In an automatic and manually operable stopping and assisting mechanism for automobiles consisting partly of brake shoes that are carried from their operative position to their inoperative position through the revolving wheel with which they are associated, an operating mechanism for said brake shoes, comprising a rod constituted by several units, connections with said rod for pushing the latter backwards by hand and by foot, parts associated with said rod for permitting the automatic operation of said brake shoes through said rod, these parts comprising a recoil fender, a frame secured thereto, abutments arranged on said rod, a stable part in which a part of said frame of the recoil fender is adapted to freely move lengthwise, a number of movable parts inserted in cut-outs on said stable part and each connected to and engageable with its individual abutment on said rod and normally being in the way of said part of the frame that is movable in said stable part, but adapted to move out of the way of that part of the frame when the latter pushes it, and being also adapted to push at the same time said rod for operating said brake shoes, said recoil fender and its frame adapted to be advanced to its foremost position or to any less advanced one and despite the various positions the recoil fender and its frame may have, the latter being always adapted to operate said rod and push it backwards when the latter is pushed forward, and consequently bring thereby the brake shoes into operative position at the occurrence of a collision with said fender.

10. In an automatic and manually operable stopping and assisting mechanism for automobiles consisting partly of brake shoes that are carried from their operative position to their inoperative position through the revolving wheel, a concentrically arranged stable hub fixed relative to the axle of the wheel with which the brake shoe is associated, an annularly shaped revolvable hub portion to which the brake shoe is secured, three shoulders on said revolvable hub portion, a latch arm adapted to engage said shoulders and to exert pressure upon the outer surface of said revolvable hub portion, excepting when said brake shoe moves to the active position and while it remains in the latter, said revolvable hub-portion being thus held in an eccentric position relative to the wheel axle when pressed on by said latch arm, and a spring for causing the pressure which said latch arm exerts upon said revolvable hub portion.

11. In an automatic and manually operable stopping and assisting mechanism for automobiles consisting partly of brake shoes that are carried from their operative position to their inoperative position through the revolving wheel, a revolvable hub portion to which is secured one of said brake shoes and having an incomplete circular outer surface, a latch arm, arranged for engaging said surface of the revolvable hub portion, a lever and a spring, the latter pressing that lever against one of the sides of said latch arm, and means on said lever and latch arm causing through the exerted pressure the latch arm to snap completely into and completely out of engagement with said circular surface of the revolvable hub portion.

12. In an automatic and manually operable stopping and assisting mechanism for automobiles consisting partly of a recoil fender having a frame, a windlass near the driver's seat, consisting partly of a drum and being divided into partitions of which one serves for winding up a flexible member, such as a wire rope, for pulling the recoil fender and its frame forward, and another of said partitions, serving for winding up a flexible member, similar to the first mentioned, for pulling said recoil fender and its frame backwards, another partition on said windlass, consisting of a part of said drum and a brake band passed over it, one of the ends of this brake band affixed to a stable part on the automobile and the other end affixed to a pedal, in such way, that the driver can apply braking pressure upon the drum of the windlass by stepping on said pedal and thus making said fender more resisting to pressure exerted upon it at the occurrence of a collision.

13. In an automatic and manually operable stopping and assisting mechanism for automobiles, brake shoes of the kind that are carried from the operative position to their inoperative position through the revolving wheels with which they are associated, two brake shoes for each wheel, one having spikes and the other none, the one with the spikes having connections permitting only the manual operation of that brake shoe, while the other brake shoe having such connections that permit the manual operation at any time and the automatic operation at the occurrence of a collision.

14. In an automatic and manually operable stopping and assisting mechanism for automobiles consisting partly of brake shoes that are carried from their operative position to their inoperative position through the revolving wheels with which they are associated, each of said brake shoes constituted by a uniform piece which has two parts for selectively engaging the ground for stopping purposes, a movable member associated with one of said parts and being slidably arranged and holding spikes by means of pivots, said uniform piece having openings, so formed, that said spikes normally lie therein without projecting from them which, however, will be turned on their pivots to project from their respective holes when the slidably arranged member is shifted by the revolving wheel moving in the normally forward direction while the brake shoe is held in operative position, said spikes thus entering the ground when said part with the holes and having the pivoted spikes projecting therefrom engages the ground, said spikes, however not entering the ground but lying flat in said holes when said slidably arranged member is not shifted by the revolving wheel, which occurs when said shoe is not forcibly held in the operative position in which said last mentioned part, however, is to engage the ground simultaneously, some spikes arranged to project through their specially arranged holes when the slidably arranged member is moved in the direction in which it is shifted by the wheel that turns in the direction in which the automobile will be moved backwards.

15. In an automatic and manually operable stopping and assisting mechanism for automobiles, a recoil fender, including a frame, a belt in form of a strap secured to the rear end of said frame and means for manually pulling said recoil fender by means of said belt forward after the fender and frame thereof has been pushed back, an electric arrangement for performing the forward pulling of the fender and its frame automatically, said electric arrangement including a source of electricity carried by the automobile, an electric motor with means for pulling thereby said strap when the motor is energized, a part of said frame formed as an electric conductor and being insulated from the remainder of the frame, another part, electrically connected with said motor, contacting with said part of the frame while that frame is being pushed backwards and closing thereby the circuit for said motor, said other part contacting with an insulation and thus interrupting said circuit when the recoil fender and its frame is completely pushed forward.

HEINRICH KARL.